April 13, 1926. 1,580,221
E. W. SEAHOLM
VEHICLE
Filed Jan. 25, 1924
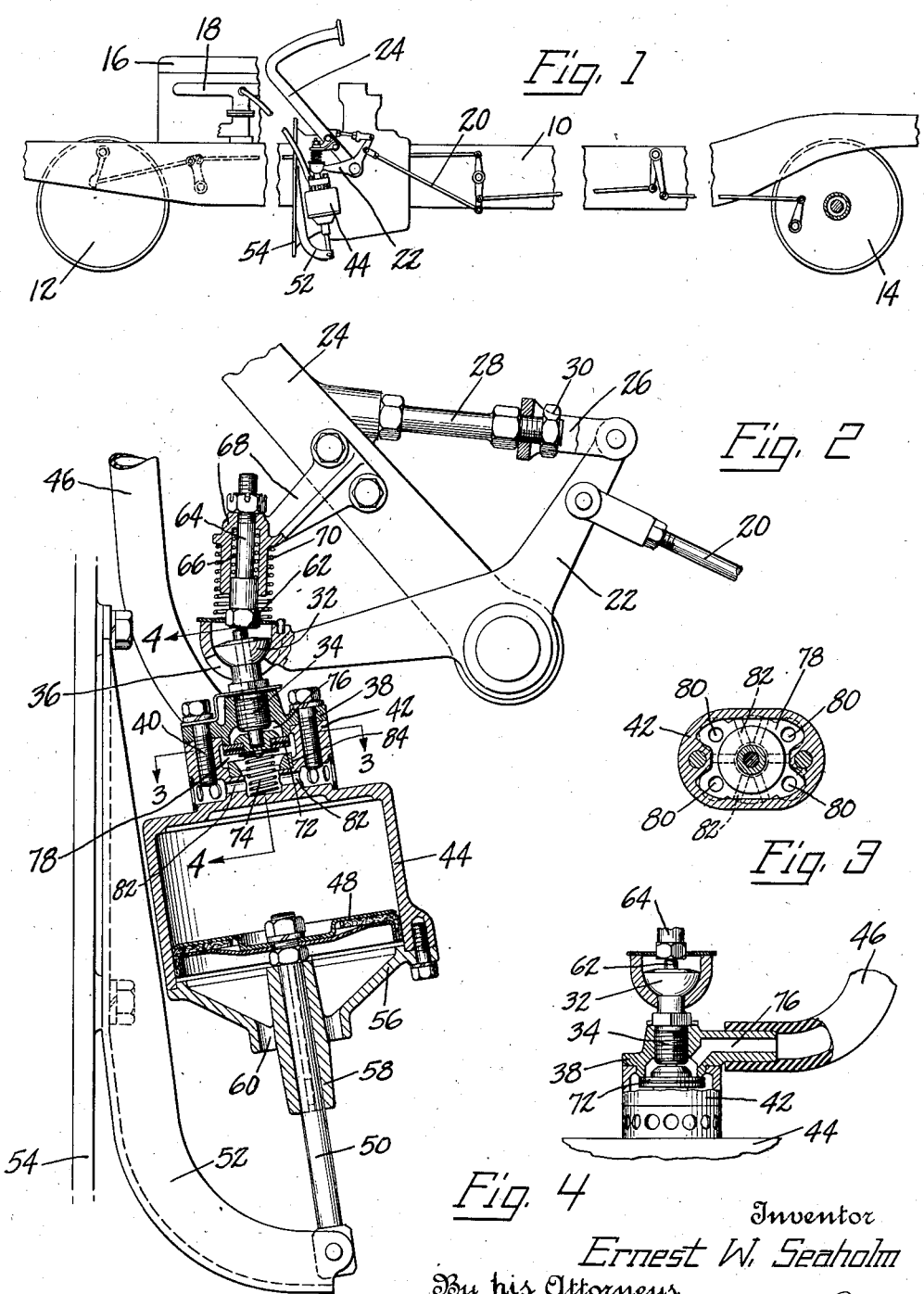

Patented Apr. 13, 1926.

1,580,221

UNITED STATES PATENT OFFICE.

ERNEST W. SEAHOLM, OF DETROIT, MICHIGAN, ASSIGNOR TO GENERAL MOTORS CORPORATION, OF DETROIT, MICHIGAN, A CORPORATION OF DELAWARE.

VEHICLE.

Application filed January 25, 1924. Serial No. 688,610.

*To all whom it may concern:*

Be it known that I, ERNEST W. SEAHOLM, a citizen of the United States, and a resident of Detroit, county of Wayne, and State of Michigan, have invented certain new and useful Improvements in Vehicles, of which the following is a full, clear, concise, and exact description, such as will enable others skilled in the art to which the invention relates to make and use the same, reference being made therein to the accompanying drawings, which form a part of this specification.

This invention relates to vehicles, and is illustrated as embodied in an automobile having brakes operated by, or in which the driver is assisted by, power derived from the engine, as, for example, by suction from the intake manifold; and an object of the invention is to provide simple and efficient connections which are protected against dirt and oil and water.

In one desirable arrangement, the drive is assisted in applying the brakes, or operating some other driver-controlled mechanism, by a power device which partly or wholly operates the brake-applying medium, and which is controlled in turn by the brake pedal or its equivalent, and preferably the pedal is provided with a connection for operating this medium directly if power is not available or is insufficient. I prefer to utilize fluid power, by connecting a cylinder and piston to the brake-applying medium and controlling the admission of power fluid to the cylinder by a valve operated by the pedal. In the arrangement shown in the drawings, the valve when in one position connects the cylinder to the intake manifold, and in another position exhausts it to the atmosphere.

One feature of the invention relates to protecting the moving parts by using a stationary piston housed within a movable cylinder, which is shown as pivotally connected to the operating lever, thus permitting the cylinder to be placed with its closed end upward so that the open end is not clogged with dirt and water which would otherwise collect therein.

The above and other objects and features of the invention, including various novel combinations of parts and desirable particular constructions, will be apparent from the following description of the illustrative embodiment shown in the accompanying drawings, in which—

Fig. 1 is a diagrammatic longitudinal section of a Cadillac automobile, showing the invention embodied in the operating connections of a set of four wheel brakes;

Fig. 2 is a view partly in vertical section and partly in side elevation, showing the connection of the cylinder and piston to the brake-applying lever;

Fig. 3 is a section on the line 3—3 of Fig. 2, showing the parts connecting the cylinder and the central chamber of the control valve; and Fig. 4 is a section on the line 4—4 of Fig. 2, showing the connection between the valve and the conduit from the intake manifold.

In the drawings, the invention is shown embodied in an automobile having a chassis frame 10, front and rear brakes 12 and 14, an engine 16 with an intake manifold 18, and connections for the brakes actuated by a link 20 connected to an operating lever 22 which, according to one feature of the invention, is mounted coaxially with respect to the brake pedal 24 and is connected thereto by a lost-motion connection including a yoke 26 perforated to receive a stud 28 tapped into the pedal and threaded to receive a stop nut 30. When the engine is not running, or if sufficient power is not available to apply the brakes entirely by power, nut 30 engages the yoke and transmits the foot pressure directly from the pedal to the brake-operating connections.

One end of lever 22 is formed with a semi-spherical socket receiving a semi-spherical head 32 on a sleeve 34 passing through a slot 36 in the socket and threaded into a plate 38 secured by cap screws 40 to a hollow boss 42 formed as part of a movable cylinder 44. The hollow boss, together with the plate 38, form a chamber for the valve which controls admission of fluid power (sub-atmospheric in the case shown) to the cylinder, the chamber being connected to the intake manifold 18 by a conduit 46. Inclosed in the cylinder is an axially-stationary piston 48 having a connecting rod 50 pivotally connected to a bracket 52 secured to the fly-wheel housing 54, and if desired a cover 56 may be secured to the open end of the cylinder 44. The cover is shown as having a portion 58 sleeved on the connecting rod, and as being provided with air openings 60 to permit access of the atmosphere to the lower surface of the piston.

The valve controlling the action of the engine suction on cylinder 44 is operated by a plunger 62 in the sleeve 34 and arranged to be engaged by the head of a bolt 64 yieldingly depressed by a spring 66 in a socket formed in an arm 68 secured to the pedal 24. The spring 66 can yield to permit further depression of the pedal, to apply foot pressure directly to the brake connections through yoke 26, after the plunger 62 is fully depressed and the power is fully on. The pedal 24 and lever 22 are yieldingly urged apart into their relative initial positions by a spring 70.

In the design shown in the drawings, I have intended the cylinder and piston to apply only sufficient power to counter-balance all the return springs of the brake system and to bring the brake shoes or bands into engagement with their drums, leaving the actual breaking force to be applied by foot pressure through yoke 26. However, by making the cylinder of sufficient size, the brakes may be applied entirely by power, the extent of application of the brakes in that case being determined by the degree of angular movement of the pedal, since movement of lever 22 and cylinder 44 in an amount corresponding to the movement of the pedal will withdraw plunger 62 from the head of bolt 64, allowing reverse or exhaust movement of the valve. It will be seen that the movement necessary to depress plunger 62 flush with head 32 is substantially equal to the lost motion before stop nut 30 engages yoke 26.

Plunger 62 carries a valve gate 72, yieldingly held by a spring 74 against an upper seat formed on the bottom of plate 38, in the position shown in Figs. 2 and 4, thus shutting off a passage 76 communicating with the suction conduit 46. In this position of the parts the central valve chamber 78, which communicates with cylinder 44 through vertical passages 80 (Fig. 3) is in communication with the atmosphere through radial ports 82. When the plunger 66 is depressed against the resistance of spring 74, as described above, gate 72 engages a seat 84, shutting off the ports 82 and placing the suction passage 76 in communication with the cylinder 44 through the valve chamber 78 and passages 80. Thus depression of plunger 62 connects cylinder 44 to the intake manifold, to be operated by sub-atmospheric pressure, while release of the plunger, to permit spring 74 to lift it to the position shown in the drawings, exhausts the cylinder to the atmosphere. In full power operation of the brakes, gate 72 balances in a position which permits application of power in an amount determined by the angular position of the brake pedal. The use of a moving cylinder, as distinguished from a moving piston, permits the cylinder to be placed with its closed end uppermost, thus preventing accumulation of dirt and water in the open end.

While one illustrative embodiment of my invention has been described in detail, it is not my intention to limit its scope to that embodiment, or otherwise than by the terms of the appended claims. The term "fluid pressure", unless specifically limited, is intended to include both super-atmospheric and sub-atmospheric pressure.

I claim:

1. A vehicle comprising, in combination, an engine having an intake manifold, a pedal and an adjacent operating lever arranged to swing in the same direction, a movable cylinder and a stationary piston, the latter being connected to the lever to operate it by atmospheric pressure, and a valve carried by and adapted to connect the cylinder to the intake manifold and to the external atmosphere, the pedal being connected and arranged to operate the valve and after a short lost motion to rock the lever by foot power.

2. A vehicle comprising, in combination, a pedal and an adjacent coaxial operating lever, a fluid-power device connected to the lever, a control valve for said device, a connection from the pedal to the valve, and a lost-motion connection from the pedal to the lever.

3. A vehicle comprising, in combination, a pedal, an operating lever, a fluid-power device connected to the lever, a two-way valve having an operating stem and acting in one position to connect said device to a source of fluid power and in the other position to connect it to the atmosphere, a member carried by the pedal to engage the valve stem to move the valve between its two positions, and a lost motion connection from the pedal to the lever.

4. A vehicle comprising, in combination, a pedal and an operating lever, both pivotally supported and adapted to swing about a common axis, a fluid-power device connected to the lever, a yieldingly-actuated two-way valve having an operating stem and acting in one position to connect said device to a source of fluid power and in the other position to connect it to the atmosphere, and a member carried by the pedal and arranged to engage the valve stem to move the valve between its two positions.

5. A vehicle comprising, in combination, a driver-operated control lever, an operating member, a fluid-power piston and cylinder arranged to operate said member, and a valve carried by the cylinder and having a port communicating with a source of fluid power and a port communicating with the atmosphere, a gate opening and closing said ports, a spring moving the gate in one direction, and a stem operated by the control lever to move the gate in the other direction against the resistance of the spring.

In testimony whereof I affix my signature.

ERNEST W. SEAHOLM.